(12) United States Patent
Yi

(10) Patent No.: US 7,580,414 B2
(45) Date of Patent: Aug. 25, 2009

(54) METHOD FOR TERMINATING ATTACH PROCEDURE IN MOBILE TERMINAL

(75) Inventor: Kyu-Hwan Yi, Seoul (KR)

(73) Assignee: Samsung Electronics Co., Ltd. (KR)

(*) Notice: Subject to any disclaimer, the term of this patent is extended or adjusted under 35 U.S.C. 154(b) by 426 days.

(21) Appl. No.: 11/343,359

(22) Filed: Jan. 31, 2006

(65) Prior Publication Data

US 2006/0187933 A1 Aug. 24, 2006

(30) Foreign Application Priority Data

Feb. 23, 2005 (KR) .................. 10-2005-0015132

(51) Int. Cl.
*H04W 36/00* (2009.01)
(52) U.S. Cl. ................. 370/395.52; 370/352; 370/310
(58) Field of Classification Search ................ 370/310, 370/312, 328, 329, 331, 352, 353, 354, 355, 370/356, 395.1, 395.52, 912, 915
See application file for complete search history.

(56) References Cited

U.S. PATENT DOCUMENTS

| | | | | |
|---|---|---|---|---|
| 6,463,055 | B1* | 10/2002 | Lupien et al. | 370/353 |
| 6,571,095 | B1* | 5/2003 | Koodli | 455/435.1 |
| 6,708,031 | B2* | 3/2004 | Purnadi et al. | 455/436 |
| 6,907,265 | B1* | 6/2005 | Holmstrom et al. | 455/557 |
| 7,346,348 | B1* | 3/2008 | Gazzard et al. | 455/432.3 |
| 7,369,522 | B1* | 5/2008 | Soininen et al. | 370/328 |
| 2002/0142749 | A1* | 10/2002 | Muniere et al. | 455/403 |
| 2003/0153309 | A1* | 8/2003 | Bjelland et al. | 455/432 |
| 2004/0147242 | A1* | 7/2004 | Pasanen et al. | 455/403 |
| 2005/0037753 | A1* | 2/2005 | Andersen et al. | 455/435.2 |

FOREIGN PATENT DOCUMENTS

WO WO 00/01173 1/2000

OTHER PUBLICATIONS

Mobile Radio Interface Layer 3 Specification; Core Network Protocols; Stage 3, Jan. 2005.

* cited by examiner

*Primary Examiner*—Jean A Gelin
(74) *Attorney, Agent, or Firm*—The Farrell Law Firm, LLP

(57) ABSTRACT

A function by which an unnecessary General Packet Radio Service (GPRS) attach procedure is no longer performed when a service cancellation situation is generated during execution of a GPRS attach procedure according to a data service requested by a user is implemented. To do this, a system is configured to determine whether an abnormal situation occurs in an Europe-oriented General Packet Radio Service/Universal Mobile Telecommunication System (GPRS/UMTS) mobile terminal and to immediately terminate a currently proceeding attach procedure when an abnormal service cancellation situation occurs. Herein, the abnormal situation can occur when the user cancels a service during use of a data service (e.g., Wireless Application Protocol (WAP), Multimedia Message Service (MMS)) or when connection of the service fails due to a bad network state. Accordingly, by not performing an unnecessary GPRS attach procedure due to the occurrence of an abnormal situation, the mobile terminal does not have to perform an unnecessary routing area updating procedure, thereby reducing power consumption.

1 Claim, 4 Drawing Sheets

| TIMER NUM. | TIMER VALUE | STATE | CAUSE OF START | NORMAL STOP | ON THE 1st, 2nd, 3rd, 4th EXPIRY Note 3 |
|---|---|---|---|---|---|
| T3310 | 15s | GMM-REG-INIT | ATTACH REQ sent | ATTACH ACCEPT received ATTACH REJECT received | Retransmission of ATTACH REQ |
| T3311 | 15s | GMM-DEREG ATTEMPTING TO ATTACH or GMM-REG ATTEMPTING TO UPDATE | ATTACH REJ with other cause values as described in chapter 'GPRS Attach' ROUTING AREA UPDATE REJ with other cause values as described in chapter 'Routing Area Update' Low layer failure | Change of the routing area | Restart of the Attach or the RAU procedure with updating of the relevant attempt counter |

FIG.5

METHOD FOR TERMINATING ATTACH PROCEDURE IN MOBILE TERMINAL

PRIORITY

This application claims priority under 35 U.S.C. § 119 to an application entitled "Method of Terminating Attach Procedure in Mobile Terminal" filed in the Korean Intellectual Property Office on Feb. 23, 2005 and assigned Serial No. 2005-15132, the contents of which are incorporated herein by reference.

BACKGROUND OF THE INVENTION

1. Field of the Invention

The present invention relates generally to a method for terminating an attach procedure in a mobile terminal of a mobile communication system, and in particular, to a method for terminating an attach procedure performed in a call process between a terminal and a network in response to the occurrence of an abnormal abort situation in a mobile terminal of a General Packet Radio Service (GPRS) mobile communication system.

2. Description of the Related Art

Currently, the use of a mobile terminal has been expanded to include a data service as well as a voice call. According to this, a General Packet Radio Service (GPRS) that enables data communication in an existing Global System for Mobile (GSM) communication system has been developed, and a Universal Mobile Telecommunication System (UMTS), one of $3^{rd}$ generation communication systems, also has been developed to satisfy the requirements of more data and higher data rate.

To use such a data service, a mobile terminal performs an attach procedure and a packet data protocol (PDP) context activation procedure. The attach procedure and the PDP context activation procedure are performed by separate GPRS Mobility Management (GMM) and Session Management (SM), respectively. Thus, the PDP context activation procedure is performed in an SM layer to perform the data service, and to activate a PDP context, a GPRS service should be registered in a network through a GPRS attach procedure.

When the mobile terminal performs the GPRS attach procedure in a power-on state, only the PDP context activation procedure is performed for the data service. Otherwise, for the data service, the GPRS attach procedure is performed and then the PDP context activation procedure is performed. Herein, according to implementation methods, the attach procedure can be performed when the mobile terminal is turned on or when a user wants to use the data service. If the attach procedure is performed when the mobile terminal is turned on, a call setup time can be reduced by immediately performing the PDP context activation procedure when the user requests the data service, and packet switched (PS) paging can be served.

However, besides the fact that periodic routing area updating is performed, normal routing area updating should be performed every time when a routing area is changed, and as a result the mobile terminal consumes more power. In addition, when routing area updating is performed while the user is not using the data service, if a rejection is received due to a temporarily bad network state, a bad impression can be given to the user. On the contrary, if the attach procedure is performed only when the user uses the data service, advantages and disadvantages opposite to the above description exist.

Presently, unlike the voice call, paging is hardly used for the data service. In addition, since a mobile originated (MO) PS call by which a user initiates a service is mainly used and no application using a mobile terminated (MT) PS call exists, the two methods described above can be used.

As described above, in the prior art, when an attach procedure is performed only when a user uses a data service, if the user attempts the data service and cancels the data service before a PDP context activation procedure is completed, the PDP context activation procedure is aborted in an SM layer but the attach procedure performed in a GMM layer is not aborted. In addition, if the GPRS attach procedure has been already completed, a detach procedure is not performed.

In another case, when the user attempts the data service, if an attach accept message from a network in response to an attach request message from a mobile terminal does not exist due to a bad network state or a bad wireless environment, the user will typically cancel the data service without waiting for an extended time period for the response. However, though the data service has been cancelled by the user, a GPRS attach procedure attempted by the data service is continuously attempted with reference to a timer and an attempt counter defined by a protocol, and thus, the GPRS attach procedure is completed only when the mobile terminal enters into a stable network.

As described above, since a case where a GPRS attach procedure is performed when a user uses a data service cannot be discriminated from a case where the GPRS attach procedure is performed when a mobile terminal is turned on, an unnecessary attach procedure is performed in the situation described above.

SUMMARY OF THE INVENTION

An object of the present invention is to substantially solve at least the above problems and/or disadvantages and to provide at least the advantages below. Accordingly, an object of the present invention is to provide a method for terminating an attach procedure in a mobile terminal of a General Packet Radio Service (GPRS) mobile communication system, the method including an attach procedure performed in a call process between the terminal and a network which also can be terminated in response to the occurrence of an abnormal abort situation.

According to one aspect of the present invention, there is provided a method for terminating an attach procedure in a mobile terminal, the method including transmitting an attach request message to a network so that a General Packet Radio Service (GPRS) attach procedure is performed when a data service is requested; operating a timer related to execution of the GPRS attach procedure simultaneously with the transmission of the attach request message; determining whether a service cancellation request is input by a user in a state where the attach procedure has not been completed; and terminating the currently proceeding GPRS attach procedure by stopping the operation of the timer.

According to another aspect of the present invention, there is provided a method terminating an attach procedure in a mobile terminal, the method including transmitting an attach request message to a network so that a General Packet Radio Service (GPRS) attach procedure is performed when a data service is requested; determining whether a service cancellation request is generated by a user since a response to the transmission is delayed; and terminating the currently proceeding GPRS attach procedure without retrying the attach request when the service cancellation request is generated.

According to another aspect of the present invention, there is provided a method for terminating an attach procedure in a mobile terminal, the method including requesting a packet data protocol (PDP) context activation procedure when a General Packet Radio Service (GPRS) attach procedure is completed; determining whether a service cancellation request is generated by a user during execution of the requested PDP context activation procedure; aborting the PDP context activation procedure if the service cancellation request is generated; and performing a detach procedure when the PDP context activation procedure is aborted.

BRIEF DESCRIPTION OF THE DRAWINGS

The above and other objects, features and advantages of the present invention will become more apparent from the following detailed description when taken in conjunction with the accompanying drawings in which:

FIG. 5 is a diagram illustrating timers used in the mobile terminal according to a preferred embodiment of the present invention.

DETAILED DESCRIPTION OF THE PREFERRED EMBODIMENT

Figure 1:
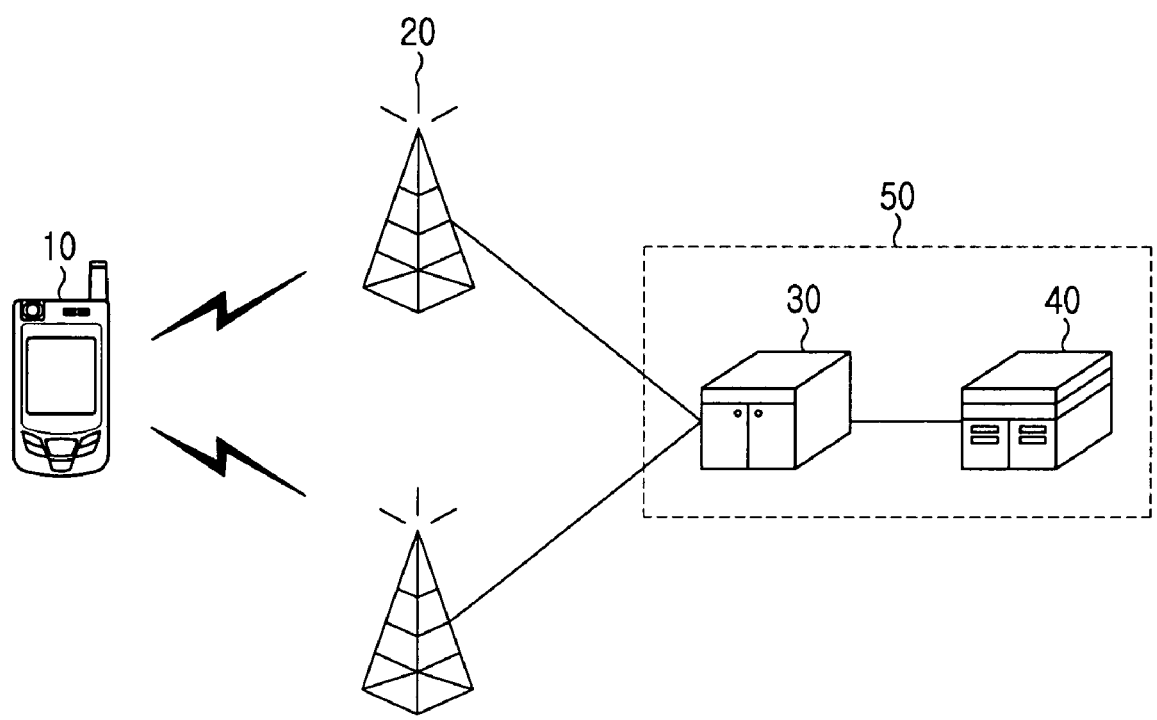
FIG. 1 is a schematic configuration diagram of a GPRS mobile communication system according to a preferred embodiment of the present invention.

Preferred embodiments of the present invention will be described herein below with reference to the accompanying drawings. In the drawings, the same or similar elements are denoted by the same reference numerals even though they are depicted in different drawings. In the following description, well-known functions or constructions are not described in detail since they would obscure the invention in unnecessary detail.

The present invention implements a function by which an unnecessary General Packet Radio Service (GPRS) attach procedure is no longer performed when a service cancellation situation is generated during execution of a GPRS attach procedure according to a data service requested by a user. To do this, the present invention is configured to determine whether an abnormal situation occurs in a Europe-oriented General Packet Radio Service/Universal Mobile Telecommunication System (GPRS/UMTS) mobile terminal and to immediately terminate a currently proceeding attach procedure when an abnormal service cancellation situation occurs. Herein, the abnormal situation can occur whereby a user cancels using a service during use of a data service (e.g., Wireless Application Protocol (WAP), Multimedia Message Service (MMS)) or where connection of the service fails due to a bad network state. Accordingly, by not performing an unnecessary GPRS attach procedure when an abnormal situation occurs, a mobile terminal does not have to perform an unnecessary routing area updating procedure, thereby reducing power consumption.

Prior to description of the present invention, an attach procedure and a detach procedure will now be schematically described.

Typically, mobility management is performed by an attach procedure starting when a user turns on a mobile terminal, a periodic routing area updating procedure, and a detach procedure performed when updating according to a routing area change is performed or when the mobile terminal is turned off. These procedures should be performed by synchronizing states of the mobile terminal and a network. However, in general, these procedures are sequentially performed. That is, in a state where the attach procedure has not been performed, a call by generation of a packet data protocol (PDP) cannot be established, and in a state where the detach procedure has been performed, all services cannot be performed. In addition, it is normal that a new attach procedure is requested after the detach procedure is completed. After the detach procedure, information no longer exists in a serving GPRS support node, and new information must be generated. However, if an attach procedure is requested in a state where an abnormal detach procedure has been performed or where the detach procedure has not been performed, it is a problem that the network has not processed a previous call yet.

To solve this problem, a function which prevents an unnecessary GPRS attach procedure between a mobile terminal and a network in a case of an abnormal termination is necessary. Components of a mobile communication system in which the function is implemented and operations of the components will now be described with reference the schematic configuration diagram of a GPRS mobile communication system according to a preferred embodiment of the present invention, as shown in FIG. 1.

Referring to FIG. 1, the GPRS mobile communication system includes a mobile terminal 10, a plurality of base stations 20 transmitting/receiving voice and data to/from the mobile terminal 10, and a network 50 which includes a base station controller 30 generally controlling the plurality of base stations 20 and an exchanger 40 connected to the base station controller 30. In the present embodiment, the exchanger 40 can be a serving GPRS support node and a gateway GPRS support node. The mobile terminal 10 and the network 50 perform a GPRS attach procedure in order to form a state which is optimal to use a data service.

In particular, the present embodiment is applied to a case where the GPRS attach procedure is performed not when the mobile terminal 10 is turned on but when a user attempts the data service. For example, the present embodiment is applied to a case where a 'Power On Attach' option in the mobile terminal 10 is disabled. Herein, the 'Power On Attach' option is an option used to determine whether the GPRS attach procedure is performed when the mobile terminal 10 is initially turned on or when the user attempts the data service. If the 'Power On Attach' option is disabled, the GPRS attach procedure is performed when the user attempts the data service.

Hereinafter, only the case where the GPRS attach procedure is performed when the user attempts the data service according to the present embodiment will be described.

A control flow to terminate a currently proceeding GPRS attach procedure due to the occurrence of an abnormal termination situation in the GPRS mobile communication system will now be described. The abnormal termination situation occurs when the user cancels the data service during the use of the data service (e.g., WAP, MMS) in the present embodiment, and in another embodiment of the present invention, the abnormal termination situation can occur when the user cancels the use of the data service while the data service is not connected due to a temporarily unstable network state or a bad wireless environment.

Figure 2:
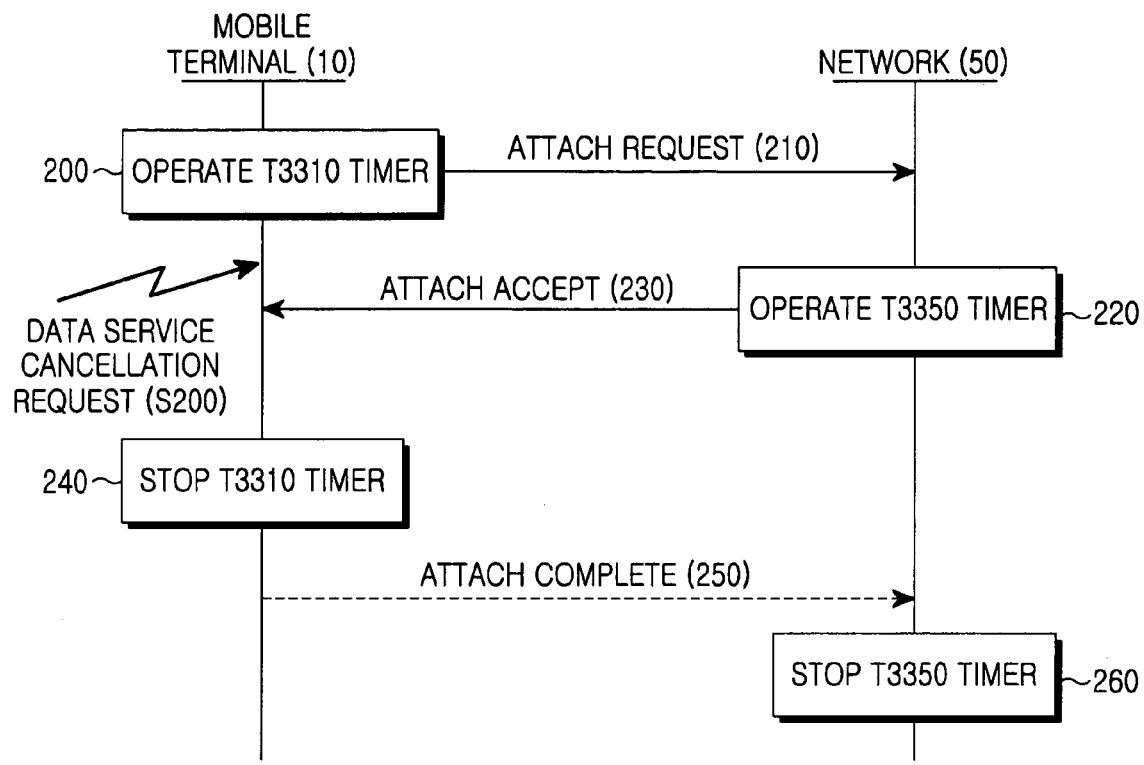
FIG. 2 is a signaling diagram illustrating a correlation between a mobile terminal and a network when a data service is cancelled before completion according to a preferred embodiment of the present invention.

A control flow to terminate a currently proceeding GPRS attach procedure in a case where a user cancels a data service during the use of the data service according to a preferred embodiment of the present invention will now be described with reference to FIG. 2. FIG. 2 is a signaling diagram illustrating a correlation between the mobile terminal 10 and the network 50 when a data service is cancelled before completion according to a preferred embodiment of the present invention.

Referring to FIG. 2, when the user requests a data service, in step 200, the mobile terminal 10 operates a T3310 timer. In step 210, the mobile terminal 10 simultaneously transmits an attach request message to the network 50 to perform a GPRS attach procedure. Herein, as shown in FIG. 5, the T3310 timer starts counting when the attach request message is transmitted and stops counting when an attach accept message or an attach reject message in response to the transmission is received. In addition, a T3311 timer can be operated with the T3310 timer, and as shown in FIG. 5, the T3311 timer starts counting when the attach reject message is received or when a routing area update is rejected and stops counting when a routing area is changed.

Typically, when the attach request message is transmitted to the network 50, in step 220, the network 50 operates a T3350 timer. In step 230, the network 50 simultaneously transmits an attach accept message in response to the transmitted attach request message to the mobile terminal 10. That is, the network 50 performs a predetermined subscriber identification procedure in response to the attach request message and then transmits the attach accept message. Since an operation performed when the network 50 receives the attach request message is similar to the conventional operation, its detailed description is omitted.

In step 240, the mobile terminal 10 stops operating T3310 timer when the attach accept message is received. Herein, the network 50 transmits the attach accept message in which a packet temporary mobile subscriber identity (PTMSI), a temporary number indicating a number type of a subscriber, is contained. In step 250, the mobile terminal 10 transmits an attach complete message to the network 50 when the PTMSI is newly allocated. In step 260, the network 50 stops the T3350 timer simultaneously when the attach complete message is received. Thus, the GPRS attach procedure is terminated.

As described above, though the mobile terminal 10 operates the T3310 timer when the attach request message is transmitted to the network 50, the user can terminate the attempted data service before completion regardless of the GPRS attach procedure. Thus, in step S200, a data service cancellation request can be input before the GPRS attach procedure between the mobile terminal 10 and the network 50 is completed. That is, the mobile terminal 10 determines whether the data service cancellation request is input by the user in a state where the attach procedure is not completed.

If the data service cancellation request is input, in step 240, the mobile terminal 10 immediately stops the operation of the T3310 timer. Herein, besides the T3310 timer, if the T3311 timer is operating, the T3311 timer is also stopped. These timers terminate their counting when the data service cancellation request is input regardless of whether the attach accept message in response to the transmitted attach request message is received. Thus, the mobile terminal 10 terminates the GPRS attach procedure by stopping the T3310 timer regardless of whether the attach accept message is received.

Figure 3:
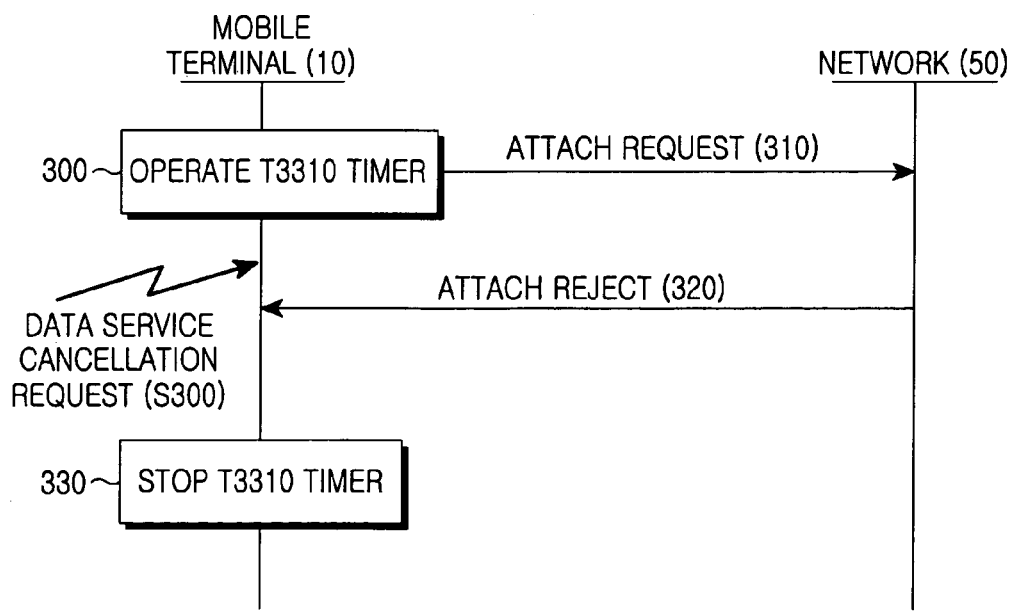
FIG. 3 is a signaling diagram illustrating a correlation between the mobile terminal and the network while a data service is not being attached according to another preferred embodiment of the present invention.

A control flow to terminate a currently proceeding GPRS attach procedure in a case where the user cancels a data service while the data service is not being connected due to a temporarily unstable network state or a bad wireless environment according to another preferred embodiment of the present invention will now be described with reference to FIG. 3. FIG. 3 is a signaling diagram illustrating a correlation between the mobile terminal 10 and the network 50 while a data service is not being connected according to another preferred embodiment of the present invention.

Referring to FIG. 3, as described above, when the user requests a data service, the mobile terminal 10 operates the T3310 timer in step 300 and simultaneously transmits an attach request message to the network 50 in step 310. However, if the network 50 is unstable, or if the mobile terminal 10 is in a bad wireless environment, the network 50 transmits an attach reject message to the mobile terminal 10 in step 320. When the mobile terminal 10 receives the attach reject message, the mobile terminal 10 stops the timer T3310 timer and/or T3311 timer in step 330. However, according to the present embodiment, before the attach reject message is received, i.e., when a response to the transmission of the attach request message is delayed, if a data service cancellation request is input by the user in step S300, in step 330, the mobile terminal 10 immediately stops the T3310 timer regardless of whether the attach reject message is received. When the GPRS attach procedure is unnecessary since the attach procedure is not retried even if the attach is delayed, it is possible to not perform the unnecessary GPRS attach procedure.

The cases where the data service cancellation request is input before the GPRS attach procedure is not completed have been illustrated above. However, a case where the user attempts a data service and then cancels the data service after the GPRS attach procedure is normally completed can exist.

Figure 4:
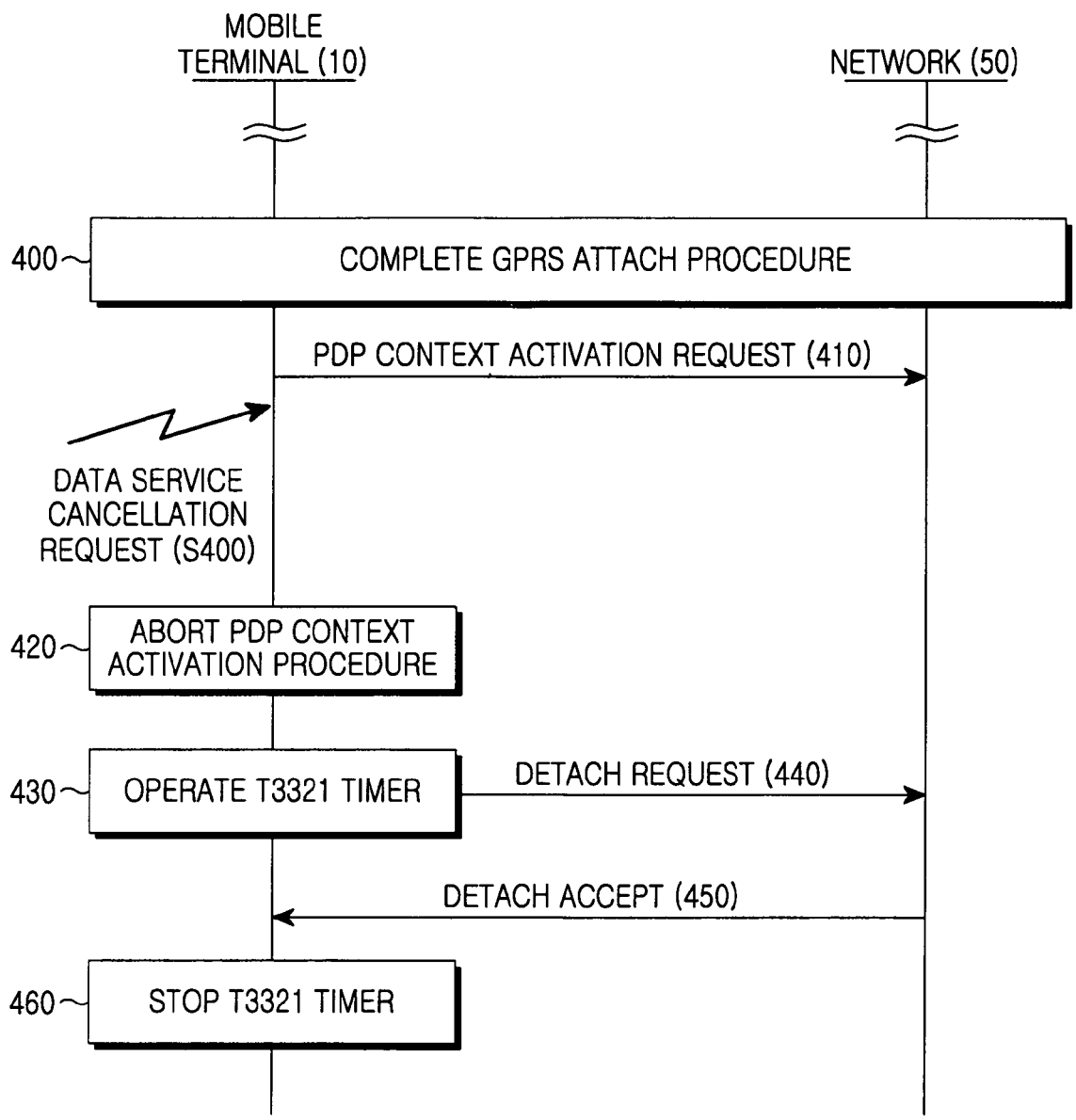
FIG. 4 is a signaling diagram illustrating a correlation between the mobile terminal and the network when a data service is cancelled after a GPRS attach procedure is completed according to a preferred embodiment of the present invention.

A signal flow between the mobile terminal 10 and the network 50 when a data service is cancelled after a GPRS attach procedure is normally completed will now be described with reference to FIG. 4. FIG. 4 is a signaling diagram illustrating a correlation between the mobile terminal 10 and the network 50 when a data service is cancelled after a GPRS attach procedure is completed according to a preferred embodiment of the present invention.

Referring to FIG. 4, if the GPRS attach procedure between the mobile terminal 10 and the network 50 is completed in step 400, a PDP context activation procedure for transmission of a GPRS packet between the mobile terminal 10 and the network 50 starts.

In step 410, the mobile terminal 10 transmits a PDP context activation request message to the network 50. Then, after receiving the PDP context activation request message from the mobile terminal 10, the network 50 transmits a PDP context activation accept message to only the mobile terminal 10, which has requested the PDP context activation with an authorized user and correct information. However, if a data service cancellation request is input by the user during the PDP context activation procedure in step S400, in step 420, the mobile terminal 10 aborts the currently proceeding PDP context activation procedure. In addition, a detach procedure is performed so that the network 50 is not in a state where a previous call is not processed due to an input of a new attach request in a state where the detach procedure is not performed.

Thus, the mobile terminal 10 operates a T3321 timer indicating the time when the detach is requested in step 430 and simultaneously transmits a detach request message to the network 50 in step 440. In step 450, the network 50 transmits a detach accept message to the mobile terminal 10 which has requested the detach. After receiving the detach accept message, the mobile terminal 10 terminates the detach procedure by stopping the T3321 timer in step 460. As described above, a new attach procedure is possible after the detach procedure is performed.

As described above, according to embodiments of the present invention, by not performing an unnecessary GPRS attach procedure when an abnormal situation occurs between a mobile terminal and a network, the mobile terminal does not have to perform an unnecessary routing area updating procedure, thereby reducing power consumption.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method of terminating an attach procedure in a mobile terminal, the method comprising the steps of:

transmitting an attach request message to a network so that a General Packet Radio Service (GPRS) attach procedure is performed when a data service is requested;

operating a timer related to an execution of the GPRS attach procedure simultaneously with the transmission of the attach request message;

determining whether a service cancellation request is input by a user in a state where the GPRS attach procedure has not been completed; and terminating the currently proceeding GPRS attach procedure by stopping the operation of the timer, wherein the timer starts counting when the attach request message is transmitted and stops counting when the service cancellation request is input regardless of whether an attach accept message in response to the transmission is received.

* * * * *

UNITED STATES PATENT AND TRADEMARK OFFICE
CERTIFICATE OF CORRECTION

PATENT NO. : 7,580,414 B2  Page 1 of 1
APPLICATION NO. : 11/343359
DATED : August 25, 2009
INVENTOR(S) : Kyu-Hwan Yi It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 632 days.

Signed and Sealed this

Fourteenth Day of September, 2010

David J. Kappos
*Director of the United States Patent and Trademark Office*